United States Patent
Aliev et al.

(10) Patent No.: US 9,069,797 B1
(45) Date of Patent: *Jun. 30, 2015

(54) SYSTEM AND METHOD FOR FILE SYSTEM SIMULATION

(75) Inventors: Artem Aliev, Sosnovi Bor (RU);
Mikhail Ilyin, Saint-Petersburg (RU);
Vitaly Kozlovsky, Saint-Petersburg (RU); Ilya Shavlyuk, Saint-Petersburg (RU); Nikolay Vyatkin, Saint-Petersburg (RU)

(73) Assignee: EMC CORPORATION, Hopkinton, MA (US)

( * ) Notice: Subject to any disclaimer, the term of this patent is extended or adjusted under 35 U.S.C. 154(b) by 1266 days.

This patent is subject to a terminal disclaimer.

(21) Appl. No.: 12/344,117

(22) Filed: Dec. 24, 2008

(51) Int. Cl.
G06F 7/00 (2006.01)
G06F 17/00 (2006.01)
G06F 17/30 (2006.01)

(52) U.S. Cl.
CPC ................ G06F 17/30286 (2013.01)

(58) Field of Classification Search
CPC .......... G06F 17/3089; G06F 17/30575; G06F 17/30097; G06F 17/30861; G06F 17/30286
USPC .......... 707/200; 709/318, 205, 230; 370/260; 705/14.51; 711/161
See application file for complete search history.

(56) References Cited

U.S. PATENT DOCUMENTS

| | | | | |
|---|---|---|---|---|
| 7,013,289 | B2* | 3/2006 | Horn et al. | 705/14.51 |
| 7,200,668 | B2* | 4/2007 | Mak et al. | 709/230 |
| 7,406,499 | B2* | 7/2008 | Singh et al. | 709/205 |
| 7,467,265 | B1* | 12/2008 | Tawri et al. | 711/161 |
| 7,712,134 | B1* | 5/2010 | Nucci et al. | 726/23 |
| 7,839,803 | B1* | 11/2010 | Snelgrove et al. | 370/260 |
| 2002/0095525 | A1* | 7/2002 | Fables et al. | 709/318 |
| 2007/0033214 | A1* | 2/2007 | Lewis et al. | 707/102 |
| 2007/0271556 | A1* | 11/2007 | Eggers et al. | 717/151 |
| 2007/0288526 | A1* | 12/2007 | Mankad et al. | 707/200 |

OTHER PUBLICATIONS

Thekkath, Chndramohan A., et al., Techniques for File System Simulation Software—Practice and Experience, vol. 24(11), 981-999 (Nov. 1994).

* cited by examiner

*Primary Examiner* — Susan Chen
(74) *Attorney, Agent, or Firm* — Dergosits & Noah LLP; Todd A. Noah

(57) ABSTRACT

The invention is a system and method for generating a file system model at a selected point in time without requiring sequential generation of file system models for each point in time prior to the selected point in time. Present data modeling require that data be generated using some initial point, then passed through time intervals in order to simulate the data at a later point in time. The invention does not require sequential data generation. Instead, any arbitrary point in time may be selected, and the data may be modeled at that selected timepoint. The invention stores a compact representation of file system data for each timepoint. Whenever a user wants to simulate data at some timepoint, the proper compact representation is selected and expanded to produce a simulation of the data at that timepoint.

6 Claims, 3 Drawing Sheets

PRIOR ART DYNAMIC DATA GENERATION

PRIOR ART TRACE-DRIVEN SIMULATION

SYSTEM AND METHOD FOR FILE SYSTEM SIMULATION

CROSS REFERENCE TO RELATED APPLICATIONS

This nonprovisional patent application is related to co-pending U.S. patent application Ser. No. 12/344,107, entitled, "SYSTEM AND METHOD FOR MODELING DATA CHANGE OVER TIME," which is incorporated by reference.

FIELD

The present invention relates generally to file system simulation, and specifically, to generating data for a simulated file system at any selected point in time without having to generate data for a previous point in time.

BACKGROUND

Data objects, such as files and directories, are typically organized in memory or on media using a file system. Companies that design and build file systems are constantly evaluating existing file systems in order to optimize and improve upon them. However, rather than use a customer's working or active file systems, these companies will typically generate and study a file system model, also known as "simulating a file system" or "creating a file system simulation," in order to design a new file system that will fulfill the needs of the customer. The file system model is designed to simulate how the customer's working file system might behave, using synthetic data instead of real data. Afterwards, a "real" file system can be designed based upon the evaluation of the file system model.

Accurate file system models are built using information such as the size, number and types of objects to be stored on the file system. The file system model will also take into account when and how often data objects are created, deleted or edited over time on the file system (i.e., file system events). A person having skill in the art will appreciate that generating a file system model includes creating the synthetic file system's data objects, or content, that will comprise the file system model. Therefore, gathering information on how file system data objects change over time is important to the process of generating the file system model.

There are a number of ways to gather information about file system data and file system events in order to generate a file system model. Some of these methods are described in co-pending U.S. patent application Ser. No. 12/344,107, entitled, "SYSTEM AND METHOD FOR MODELING DATA CHANGE OVER TIME," which is incorporated in full herein. However, the process of actually generating the model and its associated data is often tedious, time-consuming and resource-intensive. Since a tile system is generally built to function over time, it is important to know the state of the file system at selected points in time, or "timepoints." As a result, it is not uncommon to simulate a file system at multiple timepoints. Typically, the information gathered that describes common file system events for a file system will be used to generate an initial user-defined data model. The user-defined data model is used as a foundation for generating future file system models at different timepoints. Given the fact that generating a single file system model may be time-consuming and resource-intensive, these issues become more pronounced when generating file system models for multiple timepoints.

Generating a file system model and its synthetic data typically involves two approaches: dynamic data generation and trace-driven simulation. Dynamic data generation involves generating data for a complete file system model for each selected timepoint. Dynamic data generation uses an algorithm that simulates how the data will change over time, as shown in FIG. 1. When the simulation is run, i.e. at "run-time," the dynamic generation system will take a previous file system model, such as user-defined data model 101, and using data generator 123, will apply changes to the user-defined data model 101 to generate content for a new subsequent file system model. As a result, file system content 191 will comprise of synthetic data for the new file system model.

Synthetic data will be generated for each timepoint at run-time based upon the user-defined models for those timepoints. Therefore, if the changes are logged daily, then the simulated timepoints may correspond to a certain day. For example, Day 0 may correspond to how the file system data appears initially. Day 1 may correspond to how the file system data appears the day after Day 0 by simulating files that may have been created since Day 0. Day 2 may correspond to how the file system data appears following Day 1 by simulating how some files may have been edited, and Day 3 may simulate files that may have been deleted. This iterative process may continue until the timepoint selected by the user is reached.

Dynamic data generation simulates changes (file creation, edits, deletions, etc.) on a file system model at run-time by creating a complete file system model for the first timepoint, Day 0, then simulating the changes to create a new file system model for each subsequent timepoint. If one wishes to see how the file system data may appear on Day 30, then the simulation will require data generation from Day 0 to Day 30, resulting in the creation of 31 file systems. Each file system model for each timepoint must then be stored. As a result, dynamic data generation can be extremely time-consuming and resource-intensive. One will appreciate that the more content generated for each timepoint's respective file system model, or the higher the amount of file system events that occur between each timepoint, the longer and more complicated the simulation will be.

Trace-driven simulation involves applying an algorithm, or "trace," that summarizes simulated user activity at set timepoints. In other words, the trace describes what may be done to various files in the simulated file system. The trace for each file in a file system is generated prior to run-time. At run-time, the trace is applied to previously-generated synthetic data, and the resulting changed synthetic data is created. This is shown in FIG. 2, in which an initial user-defined data model 201 is passed through a trace generator 211. Trace generator 211 applies a trace algorithm for each of the synthetic data files in data model 201, resulting in trace files 215. In other words, each trace file 215 will correspond to a file system object in a file system model that will be generated at run-time.

Using the example above, the trace may describe that on Day 0, the file system is empty; on Day 1, that files A, B and C were created; Day 2, that file D was created and file A was edited; Day 3, that file B was deleted and file C was edited, etc. The trace, therefore, describes a sequential process of file system events. A file system model is not created until run-time, at which point the trace interpreter 222 will read the respective trace files 215 and will create file system model 291. In order to simulate the file system model on Day 3, the trace for Day 2 must be known. Similarly, in order to simulate the file system model for Day 2, the trace for Day 1 must be known, and so on. A large file system model will have a large number of trace files. Therefore, the trace-driven simulation process can also be very time-consuming and resource-intensive.

As illustrated above, a key limitation of dynamic data generation and trace-driven simulations is that they are sequential processes. In other words, in order to simulate a file system as it might appear on any arbitrary Day X, the present file system model simulators require that the simulation be run from Day 0 until Day X. This requires a significant amount of time and processing power in order to perform each simulation, especially when simulating long-term file system models. In addition, the amount of memory required to store each sequentially-created file system model can waste storage space and further handicap simulation performance.

File system models are often used to design systems for performing backup operations on a customer's file system. In most cases, backup operations are performed daily. Therefore, the task of designing and configuring a system for backing up a file system needs to be able to simulate the changes to the file system using daily timepoints. Generating a file system model for each daily timepoint that simulates how the file system changes between those timepoints will help determine the optimal backup and recovery application for the customer, as well as the customer's storage requirements. However, because present methods for file system simulation are sequential, the file system model must be simulated for a first timepoint before it can simulate a file system model for the subsequent timepoint. As previously discussed, this requires a significant amount of time, processing power and memory.

What is therefore needed is a more efficient way to simulate a file system such that a file system model can be created for any selected point in time.

BRIEF DESCRIPTION OF THE FIGURES

The present invention is illustrated by way of example and not limitation in the figures of the accompanying drawings, in which like references indicate similar elements, and in which.

DETAILED DESCRIPTION

Figure 1:
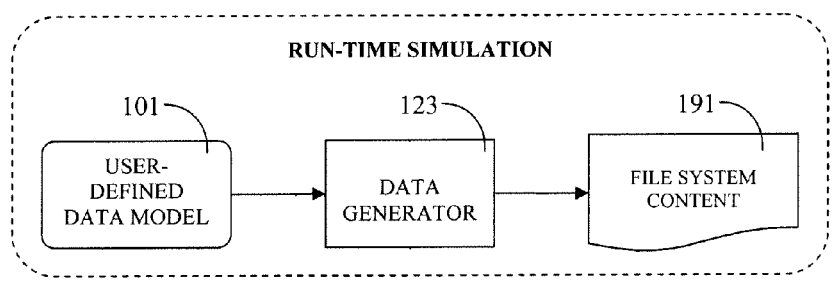
FIG. 1 is an exemplary block diagram depicting prior art dynamic data generation.
Figure 2:
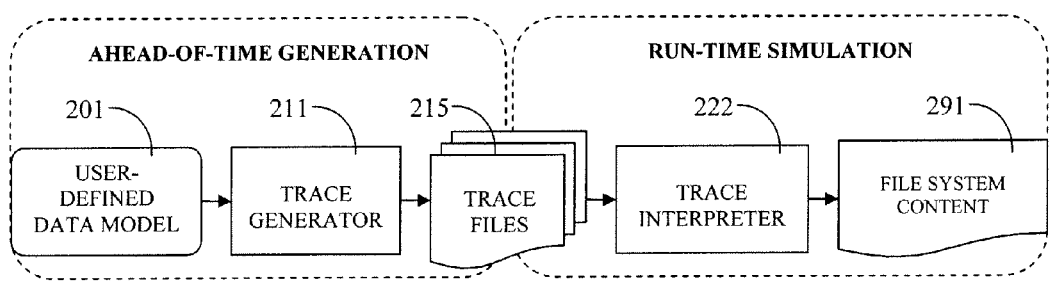
FIG. 2 is an exemplary block diagram depicting prior art trace-driven simulation.

The present invention is a system and method for quickly and efficiently generating data for a file system model at any selected point in time. As a result of the present invention, file system models do not need to be simulated sequentially, thereby significantly conserving memory, resources and time.

It should be appreciated that the present invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules.

Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

As previously discussed, generating a file system model may require using synthetic data. Synthetic data may resemble or be comprised of true data from the customer for whom the file system is being designed. If such data is not available, or if a file system is being modeled without a specific customer in mind, then the synthetic data may be comprised of random numbers, pseudo-random numbers or other similarly-generated data. One will appreciate that synthetic data can be comprised of any combination of data, and that the present invention is not restricted any particular type of data for its file system models. For example, the present invention may function equally well using actual non-synthetic data from a customer or other source.

A. System Components

Figure 3:
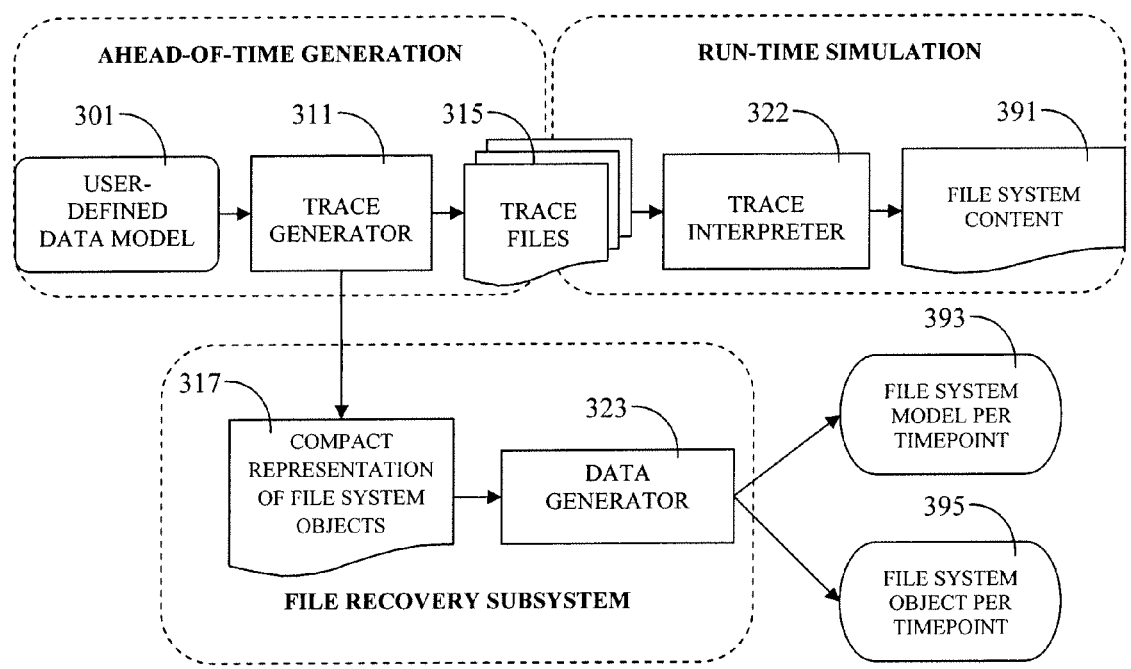
FIG. 3 is an exemplary block diagram depicting an embodiment of the present invention.

FIG. 3 shows the system components that may comprise an embodiment of the present invention. In an embodiment, the system may be comprised of two software components: a trace generator component 311 and a data generator component 323. These software components may be created using the JAVA programming language, but one skilled in the art will appreciate that other computer programming languages may be used as well. These software components may be packaged to run on a single computer, or may run in a distributed computing environment. These software components may be encoded onto a computer readable medium or may be directly stored and run from computing memory. Each component is discussed separately below.

1. Trace Generator Component and Compact Representations

In an embodiment, the trace generator component 311 is responsible for generating a trace algorithm and applying it to a user-defined data model 301. The user-defined data model 301 may describe the initial set of file system model parameters that define the size, number and type of file system objects that may comprise the content for the file system model. One will appreciate that the trace algorithms applied by trace generator component 311 to the user-defined data model 301 may be used to generate trace files in a manner similar to that performed by the prior art trace generators described above. However, unlike the trace generators of the prior art, trace generator component 311 of the present invention has the added capability to create compact representations of file system objects 317 (discussed below), which may be used to generate a file system model or individual file system objects from the file system model. This added capability thereby provides two options to the user: (1) a user may generate a file system model at a specified timepoint without having to generate previous file system models; and/or (2) the user may generate sequential file system models after generating the file system model at the specified timepoint. In other words, the present invention will enable a user to create a data system model at any Day X, as well as Day X+1, Day X+2, Day X+3, etc. In addition, the user may use the present invention to see how that file system might appear at Day Y.

Another feature of the present invention is that it can be configured to produce as much or as little of a file system model as desired. For example, a user may not be interested in seeing how an entire file system model would appear at some timepoint, but may be interested in how a portion of the file system, or even how a single file system object, may change over time. For example, the user may be interested in seeing how file system objects in a certain file directory or network share change over time. As will be discussed further below, the present invention is able to generate a whole file system model at a specified timepoint, a portion of the whole file system at the specified timepoint, or a single file system object at the specified timepoint. This provides a user with a dynamic tool for performing a variety of studies on how a file system may change over time. The option to generate a complete file system model for a timepoint, or individual file system objects for the timepoint, may be selected by the user before run-time. Data generator component 323 may then apply this configuration when the file system is generated using the compact file representations described below.

a. Compact File Representations

The present invention utilizes compact file representations in order to retain lightweight descriptions of a file system model and/or the content of a file system model. As stated above, the trace generator component 311 of the present invention is capable of creating compact representations of file system objects 317, which may later be used to generate a file system model 393 and/or a portion of the file system objects 395 from the file system model. Compact file representations may be comprised of one or more lines of code, or may be a command line description of objects in the file system using JAVA or any other computer programming language. Compact representations describe file system data, but are not actually file system content. As mentioned above, prior art file system simulation systems require storage of a file system model or trace file for each and every timepoint. This requires a substantial amount of memory. However, using a compact representation of a file system model at a certain timepoint overcomes these storage issues, since compact representations are typically much smaller in size than the file system.

Compact representations may be stored in the same memory as the software components running the present invention, or may be stored in a separate remote data structure. In an embodiment, the compact representation for a file system model will be stored and organized by timepoint. For example, there may be a directory containing compact representations for each file system object for Day X, and a separate directory containing compact representations for each file system object for Day X+1, etc. As will be discussed further below, when a user specifies a timepoint for a file system model, data generator component 323 may locate the corresponding directory containing the compact representations of the file system objects for that timepoint, and may use those compact representations to generate some or all of the file system objects for that selected timepoint. As described above, the option to generate individual file system objects or the whole file system model at a certain timepoint may be set by the user prior to run-time.

2. Data Generator Component

As discussed above, the compact data representations generated by the trace generator component 311 are mere descriptions of file system content, not the actual content itself. Thus, when a user wishes to generate the file system model for a particular timepoint, the user will only need to identify the timepoint. Once the timepoint is selected and transmitted to the data generator component 323, it will locate the compact representation of the file system for that timepoint, and the data generator component 323 will use the compact representation to generate that timepoint's corresponding file system model. Therefore, file system model generation is independent of any previous file system models, thereby providing a more instantaneous way to generate file system models.

As an additional benefit, if a generated file system model becomes lost, compromised or otherwise unusable, data generator component 323 will be able to recreate the lost file system model using its stored compact representation, thereby providing a failsafe way to study file system models without worrying if the studies will damage the file system model. Similarly, the ability to recreate the same file system model for a timepoint from the corresponding compact representation allows the user to generate the file system model, then use that file system model to generate alternative scenarios using different combinations of file system events. This may be accomplished by altering the trace applied by trace generator 311 and creating new compact representations based upon the altered trace.

One will appreciate that the above-described components may also be used to generate individual file system objects for a particular timepoint, as opposed to an entire file system model for the particular timepoint. As noted, the decision to generate a portion of a file system model or the whole file system model may be set by the user and communicated to the file generator component 323 prior to run-time.

B. Method

One will appreciate that there are many ways to implement the present invention, and that the method described herein is merely exemplary and not intended to limit the invention in any fashion. As shown in FIG. 3, in order to create a file system model, it may be necessary to gather some initial information in order to define the parameters of the file system model, which may be used to build the initial user-defined data model 301. The user-defined data model 301 contains information about the content of the file system model, such as the size, number of files, compression ratio, and the volume of changed data in the file system per time interval. The user-defined data model 301 may be used to define the file system model's parameters. The duration of the time interval (daily, monthly, annually, etc.) may also be important.

One will appreciate that if the file system model is designed to simulate a customer's existing file system, then it may be necessary to get general information from the customer, such as the number of users (and user accounts) on the file system, the type of applications and data used, etc. This information may be gathered manually or by using a logging tool that records changes to the customer's file system. If the file system model will be used for developing a backup system for the file system, it may be necessary to determine the number, size and types of files that will be backed up, i.e., characteristics of potential savesets. One will appreciate that information for designing the file system model may be gathered from other sources as well, such as using the system and method described in co-pending U.S. patent application Ser. No. 12/344,107, entitled, "SYSTEM AND METHOD FOR MODELING DATA CHANGE OVER TIME," which is incorporated in full herein.

Figure 4:
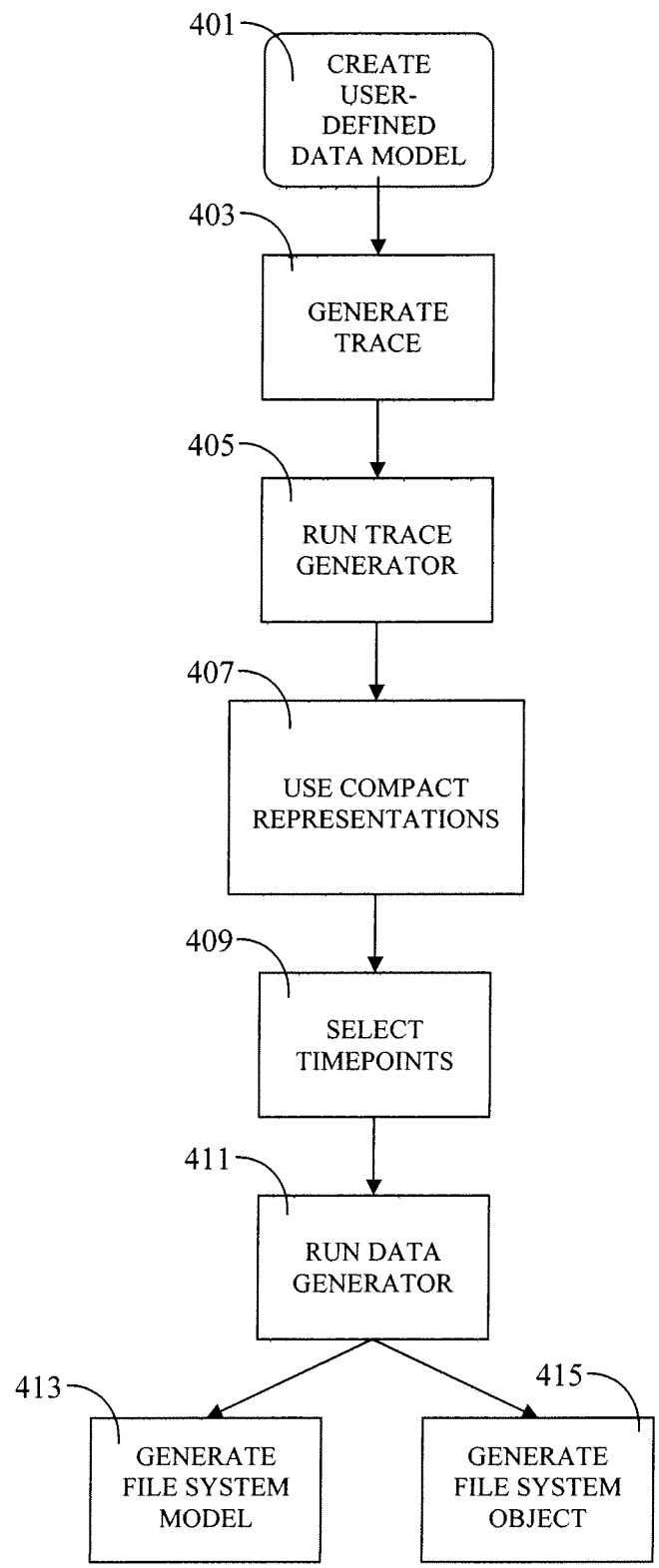
FIG. 4 is an exemplary flow diagram illustrating the steps of an embodiment of the present invention.

Once information is gathered to create the user-defined data model 301, a file system model may be generated at any selected timepoint using the method shown in FIG. 4. The steps shown in FIG. 4 may be performed by a software program that is comprised of the software components illustrated in FIG. 3. Step 401 begins with the user-defined data model. In step 403, a trace is generated that describes the changes or file system events to the data in the user-defined data model. In step 405, the trace generator is run, which may be configured to generate trace files or compact representations of file system objects. As previously discussed, generating a compact representation of file system objects may be useful if a user wishes to jump to a specific timepoint without needing to generate sequential file system models for previous timepoints. However, if the user wishes to generate a file system model for a timepoint following a particular timepoint, then generating trace files is an available option as well. The option to generate compact representations as well as trace files adds significant versatility to the present invention, and ensures that the present invention is capable of meeting the user's goals for generating file system models. The compact representations from step 405 are stored for use by the present invention.

Step 407 uses the compact representations created and stored in step 405 by the trace generator. In step 409, the user selects one or more timepoints. In addition, the user may select whether he is interested in generating individual file system objects, or the whole file system model with all synthetic file system objects. This information is passed to the data generator in step 411, which may either generate a whole file system model as shown in step 413, or an individual file system object as shown in step 415. One will appreciate that other variations of the method of FIG. 4 are possible without departing from this disclosure or the scope of present invention. For example, the user may select a timepoint for file system generation after determining whether to generate the whole file system model or an individual file system model object.

The above figures and method demonstrate how the present invention is more efficient with memory and resources than existing file system model generators. Prior art file system model generators require that once a file system model is generated, it must be stored for later analysis. As noted previously, since prior file system model generators cannot skip to arbitrary timepoints, all file system models for respective timepoints must be stored. In contrast, a compact representations of a file system model is smaller than the file system model itself. Therefore, the present invention allows for the storage of compact representations of file system models for respective timepoints. As a result, less memory is taken up by the present invention. As a further benefit, since compact representations are mere descriptions of the file system model content, rather than the content itself, the present invention may be configured to selectively generate file system objects, rather than a whole file system model for a particular timepoint. This allows the present invention to be less resource-intensive, since it may take less processing power and resources to generate a single file system object for a particular timepoint, rather than a whole file system model for that timepoint.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method for generating a file system model comprising:
    providing a file system model having a plurality of file system data objects, the file system model simulating a working file system and each file system data object corresponding to a working file system data object, and the file system model comprising synthetic data resembling true data of the working file system being simulated;
    providing a trace algorithm for each file system data object of the file system model, wherein the trace algorithm is a sequential process of file system events created before the providing of the file system model;
    generating, by a computer, a plurality of trace files for the file system model by applying a corresponding trace algorithm to each file system data object, each corresponding trace file summarizing file system events at a plurality of timepoints for the file system data object;
    generating, by a computer, compact representations of the file system data objects included in the trace files at the plurality of timepoints;
    storing, by the computer, the compact representations;
    receiving from a user a selection of a timepoint; and
    using the compact representations, generating, by the computer, a file system model for the selected timepoint or at least one file system data object at the selected timepoint, wherein the file system model is generated without the need to generate sequential file system models for timepoints previous to the selected timepoint.

2. The method of claim 1, wherein the step of generating at least one file system data object continues until a file system model representing the whole working file system for the selected non-sequential timepoints is generated.

3. The method of claim 1 wherein the one or more file system events is selected from the list consisting of file creation, file deletion, file overstrike, file insertion and file cutting.

4. A computer program product, comprising computer readable program code to be executed by one or more processors when retrieved from a non-transitory computer-readable medium, the program code including instructions to:
    provide a file system model having a plurality of file system data objects, the file system model simulating a working file system and each file system data object corresponding to a working file system data object, and the file system model comprising synthetic data resembling true data of the working file system being simulated;
    provide a trace algorithm for each file system data object of the file system model, wherein the trace algorithm is a sequential process of file system events created before the providing of the file system model;
    generate, by a computer, a plurality of trace files for the file system model by applying a corresponding trace algorithm to each file system data object, each corresponding trace file summarizing file system events at a plurality of timepoints for the file system data object;

generate, by a computer, compact representations of the file system data objects included in the trace files at the plurality of timepoints;

store, by the computer, the compact representations;

receive from a user a selection of a timepoint; and use the compact representations to generate, by the computer, a file system model for the selected timepoint or at least one file system data object at the selected timepoint, wherein the file system model is generated without the need to generate sequential file system models for timepoints previous to the selected timepoint.

5. A system for generating a file system model, the file system model simulating a working file system and each file system data object corresponding to a working file system data object, and the file system model comprising synthetic data resembling true data of the working file system being simulated, comprising:

a trace generator component executing on a computer system for generating; i) a plurality of trace files for the file system model by applying a corresponding trace algorithm to each file system data object, wherein the trace algorithm is a sequential process of file system events created before the providing of the file system model and each corresponding trace file summarizes file system events at a plurality of timepoints for the file system data object; and ii) a compact representation of a least one file system data object; and a data generator component executing on a computer system for generating, using the compact representation, a file system model for the selected timepoint or the at least one file system data object at the selected timepoint, wherein the file system model is generated without the need to generate sequential file system models for timepoints previous to the selected timepoint.

6. The system of claim 5, wherein the trace generator component can also generate a trace file for the file system data object.

\* \* \* \* \*